United States Patent [19]

Shumate

[11] Patent Number: 4,921,894

[45] Date of Patent: May 1, 1990

[54] NOVEL, HIGH TEMPERATURE RESISTANT INSULATION

[75] Inventor: Monroe W. Shumate, Littleton, Colo.

[73] Assignee: Manville Corporation, Denver, Colo.

[21] Appl. No.: 182,539

[22] Filed: Apr. 18, 1988

[51] Int. Cl.$^5$ ................................................ C08K 3/34
[52] U.S. Cl. ...................... 524/377; 428/288; 524/493; 524/612
[58] Field of Search ............. 524/493, 377, 612; 428/288

[56] References Cited

U.S. PATENT DOCUMENTS

| | | | |
|---|---|---|---|
| 4,174,331 | 11/1979 | Myles | 524/612 |
| 4,247,249 | 1/1981 | Siemers | 415/174 |
| 4,411,951 | 10/1983 | Barsotti | 524/493 |
| 4,701,491 | 10/1987 | Lamont et al. | 524/493 |

FOREIGN PATENT DOCUMENTS

| | | | |
|---|---|---|---|
| 0037974 | 4/1974 | Japan | 524/494 |
| 0018644 | 2/1981 | Japan | 524/493 |
| 0018645 | 2/1981 | Japan | 524/493 |

*Primary Examiner*—Marion C. McCamish
*Attorney, Agent, or Firm*—John D. Lister; Cornelius P. Quinn; Fred A. Winans

[57] ABSTRACT

A low density high temperature resistant insulation material especially suitable for use in automotive turbine chambers which bonds well to metallic surfaces while being soft enough to remain bonded and reduce the stresses caused during thermal expansion. The inventive insulation material contains inorganic fiber; inorganic binder; hydrophilic particulate inorganic material; polymer; and preferably a setting agent and an opacifier.

11 Claims, No Drawings

NOVEL, HIGH TEMPERATURE RESISTANT INSULATION

FIELD OF THE INVENTION

This invention relates to a novel, high temperature resistant insulation material and more particularly, it relates to an inorganic based insulation material which is especially suitable for use in the automotive field, e.g. as insulation for the interior of a turbine chamber for automotive engines.

BACKGROUND OF THE INVENTION

Over the years, there has been an increasing need for high temperature resistant insulation materials within the automotive industry. For example, there is a pressing and continuing demand within the industry for a practical and effective insulation material for the interiors of turbine chambers.

In the past, the materials which have been used for turbine chamber insulation have not been entirely satisfactory. For example, refractory fiber blankets which were hand laid or installed had a limited service life and would delaminate from metal surfaces. Additionally, the blankets were labor intensive to install.

Vacuum formed refractory fiber insulation was also tried. However, it did not form a good bond with the interior surface of the turbine chamber. Furthermore, it suffered from dimensional variations, i.e. the insulation would tend to warp and shift and not fit in the turbine chamber housing.

Somewhat extrudable, refractory fiber containing inorganic bonded insulation material was used in the past. This material was too dense, though, and consequently its thermal conductivity values were too high. The thermal conductivity was also poor because the insulation material would form internal voids during drying. Additionally, the material would not bond well to the aluminum surface of the turbine chamber. Even if the material did form a bond, the insulation would be so rigid that it would deliminate from the metal surface due to variations in thermal expansion.

Therefore, what is needed in the industry is a low density, high temperature resistant insulation material which bonds well to metallic surfaces while being soft enough to remain bonded and reduce the stresses caused by thermal expansion. Other properties such as easy moldability and low shrinkage would also be desirable.

BRIEF SUMMARY OF THE INVENTION

By the present invention, there is provided a low density, high temperature resistant insulation material which will bond well to metallic surfaces such as aluminum. Briefly, the inventive insulation material comprises about: (a) 35-75 wt% inorganic fiber; (b) 15-35 wt% inorganic binder; (c) 4-10 wt% hydrophilic particulate, inorganic material having a surface area of at least about 100 $m^2/g$; and (d) 0.5-5 wt% polymer. The use of a setting agent for the binder and an opacifier are preferred.

The inventive insulation material is low density, has a low thermal conductivity, is easily moldable, and bonds well to metallic surfaces while withstanding variations in thermal expansion during use.

Other features and aspects, as well as the various benefits, of the present invention will be made clear in the more detailed description which follows.

DETAILED DESCRIPTION OF THE INVENTION

The inventive insulation material contains the following ingredients at the indicated weight percentage levels based upon the weight of the inventive material.

| Ingredients | Broad | Preferred |
| --- | --- | --- |
| Inorganic Fiber | 35-75 | 60-70 |
| Inorganic Binder | 15-35 | 18-21 |
| Hydrophilic Particulate Inorganic Material | 4-10 | 5-7 |
| Polymer | 0.5-5 | 1-3 |
| Setting Agent | 0-6 | 1-4 |
| Opacifier | 0-15 | 7-10 |

The inorganic fiber can be a glass fiber, a mineral wool fiber, a ceramic fiber, a refractory fiber or the like. Preferably, the fiber utilized will have a temperature resistance of at least about 1400° F., most preferably at least about 2300° F. Additionally, it is preferred that the inorganic fiber be a low shot content fiber as this will allow amounts of fiber to be utilized down toward the lower end of the weight percentage range.

Examples of inorganic binders which can be utilized include but are not limited to colloidal silica, ethyl silicate, ammonium phosphate, aluminum phosphate, colloidal alumina, zirconium acetate, and aluminum chloride. Colloidal silica is preferred because of its availability; its ability to adjust setting characteristics and/or control bond migration during product drying; and its compatibility with other organic additives.

The hydrophilic particulate inorganic material employed in the present invention acts as both a filler and a bulking agent (to absorb and retain water). As used herein, the term hydrophilic signifies the ability of the particulate material to do the latter.

The surface area of the hydrophilic material will generally be greater than about 100 $m^2/g$, preferably greater than about 150 $m^2/g$.

Examples of hydrophilic particulate material which can be utilized in the present invention include but are not limited to fumed silica, precipitated silica, micron size synthetic amorphous silica, and other fumed oxides.

At least one polymer selected from the group consisting of (a) polyalkylene oxides, (b) cellulose ethers, (c) polyalkylene glycols; and (d) copolymers of vinyl amides and acrylic acids is employed in the present invention.

Examples of the foregoing polymers which can be utilized in the present invention include but are not limited to polymers of ethylene oxide; propylene oxide; hydroxyethyl cellulose; hydroxymethyl cellulose; polyethylene glycol; acrylamide-acrylate copolymers; methylacrylamide-acrylate copolymers; and the like.

The organic polymer helps to provide good extrusion and molding characteristics for the mixture. It is believed that the organic polymer assists in water retention during formation of the insulation product; helps control drying shrinkage; and assists in the bonding of the insulation to metal surfaces such as aluminum.

It is preferred that the inorganic binder and polymer employed in the present invention have maximum compatibility with one another. Thus, the binder employed for use should preferably have as minimum a tendency as possible to degrade the particular polymer employed.

Colloidal silica, the preferred binder of the present invention, has been found to be compatible with all three different types of polymers. It is preferable, though, to use colloidal silica with ethylene oxide. Alkylene oxides have been found to be particularly compatible with ethyl silicate and colloidal aluminum. Cellulose ethers have been found to be particularly compatible with aluminum phosphate, ammonium phosphate, zirconium acetate, and aluminum chloride.

In a preferred embodiment, the inorganic binder may be set by any suitable method known to those skilled in the art. Generally, the mechanism to set the binder will be by gelation using either an organic, e.g. cationic starch, or inorganic, e.g. setting agent.

It may also be preferable to employ an opacifier in the present invention where enhanced thermal conductivity is desired. Examples of suitable opacifying agents include silicon carbide, titania, and magnesium oxide.

The inventive insulation material is made by first forming an aqueous slurry of the ingredients. The solids content of the aqueous mixture will preferably be from about 20–40 wt%, most preferably from about 27–37 wt%. Water is employed to help control the density of the final insulation product and also to provide extrusion and molding characteristics without the compression and density increase of the insulation during its installation.

The mixture is then formed into the desired shape. If it is desired to set the product as described herein earlier, the setting agent is then added. Afterwards, the shaped mixture is dried into an insulation product.

Generally, the inventive insulation material will have a density in the range of from about 12–30 p.c.f., preferably about 15–22 p.c.f.

The following non-limiting example further illustrates the present invention.

EXAMPLE

18–26 pound per cubic foot density samples of the inventive insulation material were made from a mixture of the following ingredients:

| | | Weight | %, Dry wt. |
|---|---|---|---|
| 1. | refractory fiber (chrome fiber) | 60 gms | 61.2 |
| 2. | fumed silica | 6 gms | 6.1 |
| 3. | colloidal silica (Nyacol 215) | 121 gms (18 gm dry) | 18.4 |
| 4. | cationic starch setting agent | 2 gms | 2.0 |
| 5. | polyethylene glycol polymer | 1 gm | 1.0 |
| 6. | acrylamide-acrylate copolymer (NALCO ® 2332) | 1 gm | 1.0 |
| 7. | magnesium oxide opacifier | 10 gm | 10.2 |
| 8. | water | 130 gm | |
| | total weight wet | 326 gm | |
| | total weight dry | 98 gm | 99.9 |

60 gms of loose bulk refractory fiber along with 6 gms of fumed silica, 2 gms of starch, 1 gm of polyethylene glycol polymer (WS-301, available from Union Carbide Company, Danbury, Conn.), and 10 gms of magnesium oxide was placed into a 3 liter capacity Hobart mixer. One gm of NALCO ® 2332 acrylate-acrylamide copolymer (available from Nalco Chemical Company of Oak Brook, Ill.) polymer was placed on the lower portion of the mixing blade. The mixer was turned on at low speed and the 100 ml (100 gms) of water was slowly added. The material was then allowed to mix for approximately 30 seconds. Next the full 110 milliliters (121 gms) of colloidal silica was added while the material continued to be mixed. The material was allowed to mix for an additional 15 to 30 seconds. The speed of the mixer was turned up to medium and the material was blended for an additional 15 to 30 seconds.

The formed mixture was then molded or formed into place using hand lay up techniques. After the material was formed into place it was either air or oven dried. For oven drying the oven temperature was set between 220° to 230° F. to remove all of the water, and depending upon product thickness and air movement within the oven, the product was dried for approximately 8 hours. After the product was dried it was smoothed to final shape using sanding and grinding tools.

Various properties of the samples of the inventive insulation material were measured with the average results obtained as follows:

| Property Measured | Average Results | ASTM test Method |
|---|---|---|
| Density, pcf | 18–26 | C303 |
| Linear Fired Shrinkage (%) | | C356 |
| After 24 hr Exposure at | | |
| 220° F. | 0.5 | |
| 220° F. | 0.3 | |
| 1800° F. | 1.0 | |
| Thermal Conductivity BTU/in/ft$^2$/°F./hr. at | | C518 |
| 550° F. | 0.54 | |
| 800° F. | 0.78 | |
| 1000° F. | 0.91 | |
| Thermal Shock Resistance, 5 cycles 1800° F. 1 hr./ quench in 70° F. water | Pass | |
| Adhesion on Aluminum Plate | | |
| after oven drying | Good | |
| after 4 hr. soaking exposure at 500° F. | Good | |
| LOI, wt % loss | 1–4 | |

The foregoing data show that the inventive insulation material has a low density, low thermal conductivity, bonds well to metal surfaces, e.g. aluminum, and has good thermal shock resistance.

Reasonable modifications and variations are possible from the foregoing disclosure without departing from either the spirit or scope of the invention as defined in the claims.

We claim:

1. An insulation material comprising about:
   (a) 35–75 wt% inorganic fiber;
   (b) 15–35 wt% inorganic binder;
   (c) 4–10 wt% hydrophilic fumed particulate material having a surface area greater than about 100 m$^2$/g;
   (d) 0.5–5 wt% of at least one polymer selected from the group consisting of polyalkylene oxides; cellulose ethers; polyalkylene glycols; and copolymers of vinyl amides and acrylic acids;
   (e) 0–6 wt% setting agent; and
   (f) 0–15 wt% opacifier.

2. An insulation material according to claim 1 comprising about:
   (a) 60–70 wt% inorganic fiber;
   (b) 18–21 wt% inorganic binder;
   (c) 5–7 wt% hydrophilic fumed prticulate inorganic material having a surface area greater than about 100 m$^2$/g;
   (d) 1–3 wt% polymer;

(e) 1-4 wt% setting agent; and (f) 17-10 wt% opacifier.

3. An insulation material according to claim 1 wherein said inorganic binder is colloidal silica.

4. An insulation material according to claim 1 wherein said particulate inorganic material has a surface area of greater than about 100 m²/g.

5. An insulation material according to claim 1 wherein said polymer is a polyalkylene glycol.

6. An insulation material according to claim 1 wherein said polyalkylene glycol is polyethylene glycol.

7. An insulation material according to claim 1 wherein said polymer is a copolymer of vinyl amides and acrylic acids.

8. An insulation material according to claim 1 wherein said polymer is an acrylamide-acrylate copolymer.

9. An insulation material according to claim 1 having a density in the range of from about 12-30 p.c.f.

10. An insulation material according to claim 1 having a density in the range of from about 15-22 p.c.f.

11. An insulation material according to claim 1 wherein said hydrophilic fumed particulate inorganic material in subsection 1(c) is fumed silica.

* * * * *